US009098937B2

(12) United States Patent
Chang et al.

(10) Patent No.: US 9,098,937 B2
(45) Date of Patent: Aug. 4, 2015

(54) ELECTRONIC DEVICE AND METHOD FOR SIMULATING THREE-DIMENSIONAL MODEL OF WORKPIECE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Kuang Chang, New Taipei (TW); Xin-Yuan Wu, Shenzhen (CN); Lu Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 150 days.

(21) Appl. No.: 13/869,761

(22) Filed: Apr. 24, 2013

(65) Prior Publication Data

US 2013/0307853 A1    Nov. 21, 2013

(30) Foreign Application Priority Data

May 17, 2012    (CN) ........................ 2012 1 01532904

(51) Int. Cl.
*G06T 17/20*    (2006.01)
*G06T 15/04*    (2011.01)

(52) U.S. Cl.
CPC ................. *G06T 17/20* (2013.01); *G06T 15/04* (2013.01)

(58) Field of Classification Search
None
See application file for complete search history.

(56) References Cited

U.S. PATENT DOCUMENTS

| | | | | | |
|---|---|---|---|---|---|
| 5,905,502 | A | * | 5/1999 | Deering | 345/420 |
| 6,563,500 | B1 | * | 5/2003 | Kim et al. | 345/423 |
| 6,668,091 | B1 | * | 12/2003 | Kim et al. | 382/243 |
| 7,027,050 | B1 | * | 4/2006 | Dunnett et al. | 345/440 |
| 2008/0266286 | A1 | * | 10/2008 | Ramey et al. | 345/419 |
| 2008/0316202 | A1 | * | 12/2008 | Zhou et al. | 345/419 |

* cited by examiner

*Primary Examiner* — Said Broome
(74) *Attorney, Agent, or Firm* — Novak Druce Connolly Bove + Quigg LLP (57) ABSTRACT

In a method for simulating a three-dimensional (3D) model of a workpiece using an electronic device, the method meshes a 3D model using triangles, and outputs a first sequence of triangles of the 3D model. The method further normalizes vertexes of each of the triangles in the first triangle sequence, and obtains a meshed model of the workpiece. A 2D image of the workpiece is divided and a second sequence of triangles of the divided 2D image is obtained. The method further traverses the second sequence of triangles and obtains a pixel set and vertex coordinates of each of the triangles in the second sequence, and electronically pastes each of the triangles in the second sequence to a corresponding position in the meshed 3D model. The pasted 3D model is displayed on a display device.

18 Claims, 7 Drawing Sheets

ELECTRONIC DEVICE AND METHOD FOR SIMULATING THREE-DIMENSIONAL MODEL OF WORKPIECE

BACKGROUND

1. Technical Field

Embodiments of the present disclosure generally relate to workpiece simulation methods, and more particularly to an electronic device, a storage medium, and a method for simulating a 3D model of a workpiece.

2. Description of Related Art

Three-dimensional (3D) modeling of a workpiece is very important in 3D measurements and 3D programming. However, in traditional systems of 3D programming, such as measurement systems of computer-aided design (CAD) programming and on-line programming for example, only a virtual model is established. The virtual model cannot reflect information of the actual workpiece (e.g. surface material of the workpiece). During programming an image of the workpiece, measurement results may be affected because the virtual model does not reflect totally accurate information in relation to the workpiece.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware unit, or to a collection of software instructions, written in a programming language. One or more software instructions in the modules may be embedded in firmware unit, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
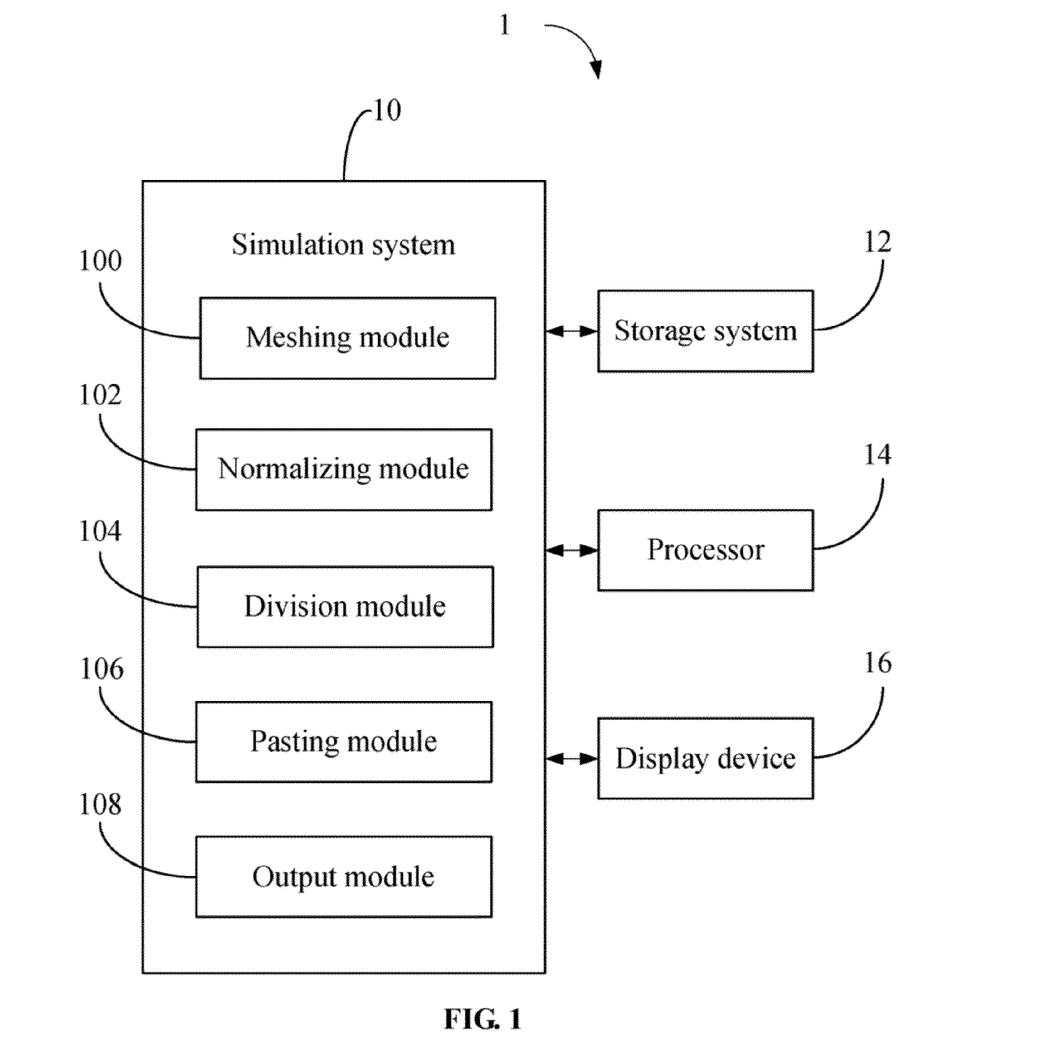
FIG. 1 is a block diagram of one embodiment of an electronic device including simulation system.

FIG. 1 is a block diagram of one embodiment of an electronic device 1 including a simulation system 10. The electronic device 1 further includes a storage system 12, at least one processor 14, and a display device 16. In one embodiment, the electronic device 1 may be a computer, a server, a portable electronic device, or any other electronic device. The simulation system 10 simulates a three-dimensional (3D) model of a workpiece (e.g., a cellphone shell or a motherboard) and outputs a realistic 3D model representing the real workpiece.

In one embodiment, the storage system 12 may be a memory (e.g., random access memory, flash memory, hard disk drive) of the electronic device 1. The storage system 12 may store an electronic graphic file of a 3D model of a workpiece, and a 2D image of the workpiece with a preset 2D coordinate system. The 3D model represents a real size of the workpiece. The 2D image is a schematic photo of the workpiece. The at least one processor 14 executes one or more computerized codes and other applications of the electronic device 1, to provide functions of the simulation system 10.

In one embodiment, the simulation system 10 includes a meshing module 100, a normalizing module 102, a division module 104, a pasting module 106, and an output module 108. The modules 100, 102, 104, 106, and 108 comprise computerized codes in the form of one or more programs that are stored in the storage system 12. The computerized codes include instructions that are executed by the at least one processor 14 to provide functions for the modules. Details of each of the modules are given in FIG. 3-FIG. 7.

Figure 2:
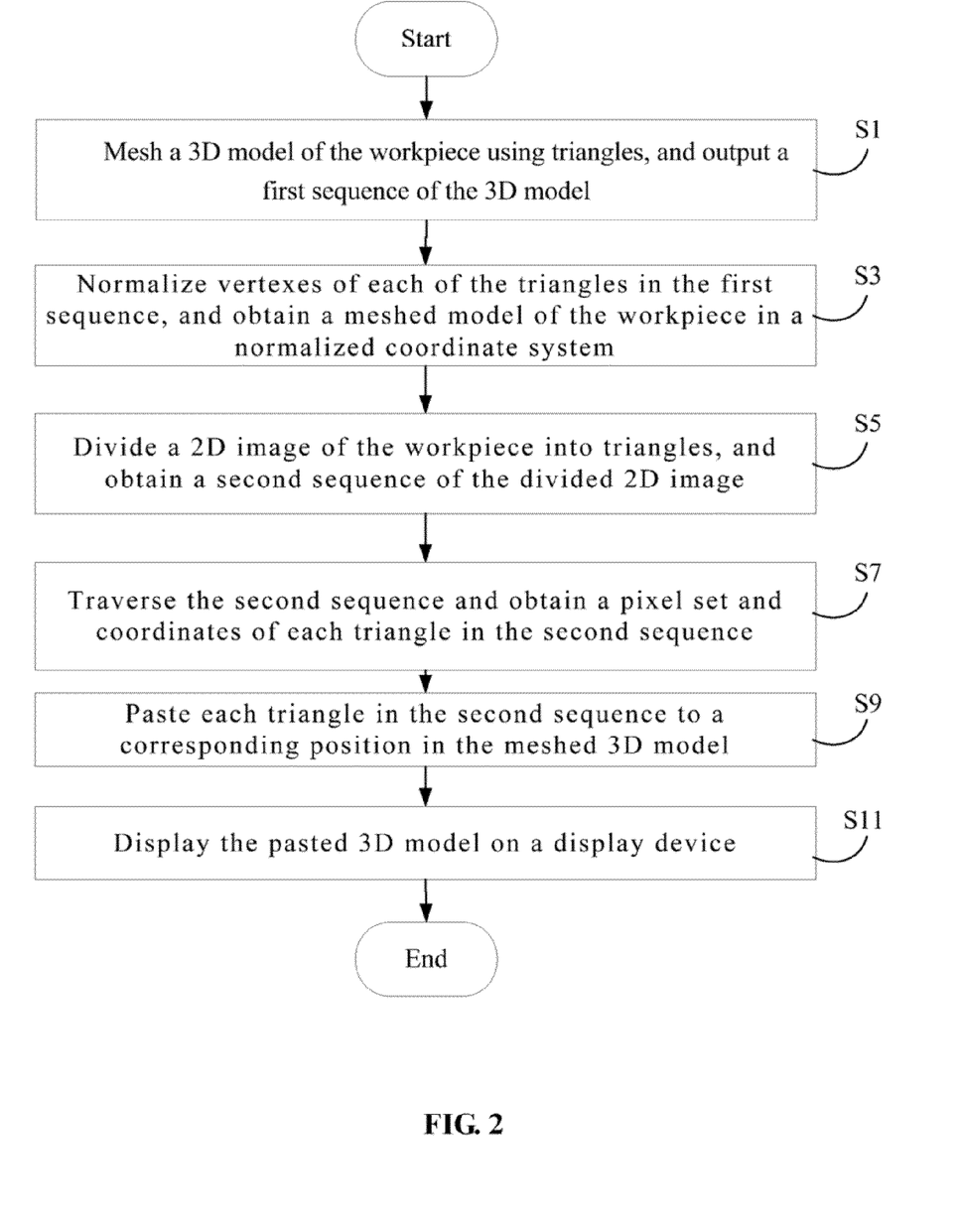
FIG. 2 is a flowchart illustrating one embodiment of a method for simulating a 3D model of a workpiece using the electronic device of FIG. 1.

FIG. 2 is a flowchart of one embodiment of a method for simulating the workpiece using the electronic device of FIG. 1. Depending on the embodiment, additional steps may be added, others deleted, and the ordering of the steps may be changed.

In step S1, the meshing module 100 meshes a 3D model of a workpiece using triangles, and outputs a first sequence of the triangles of the 3D model. The first sequence includes parameters (e.g. coordinates) of each of the triangles of the 3D model. Details of meshing the 3D model are described in FIG. 3 and FIG. 4.

In step S3, the normalizing module 102 normalizes vertexes of each of the triangles in the first sequence, and obtains a meshed model of the workpiece in a normalized coordinate system. The normalized coordinate system is established using a first scaling according to the 3D model of the workpiece. Details of normalizing the vertexes are described in FIG. 5.

Figure 6:
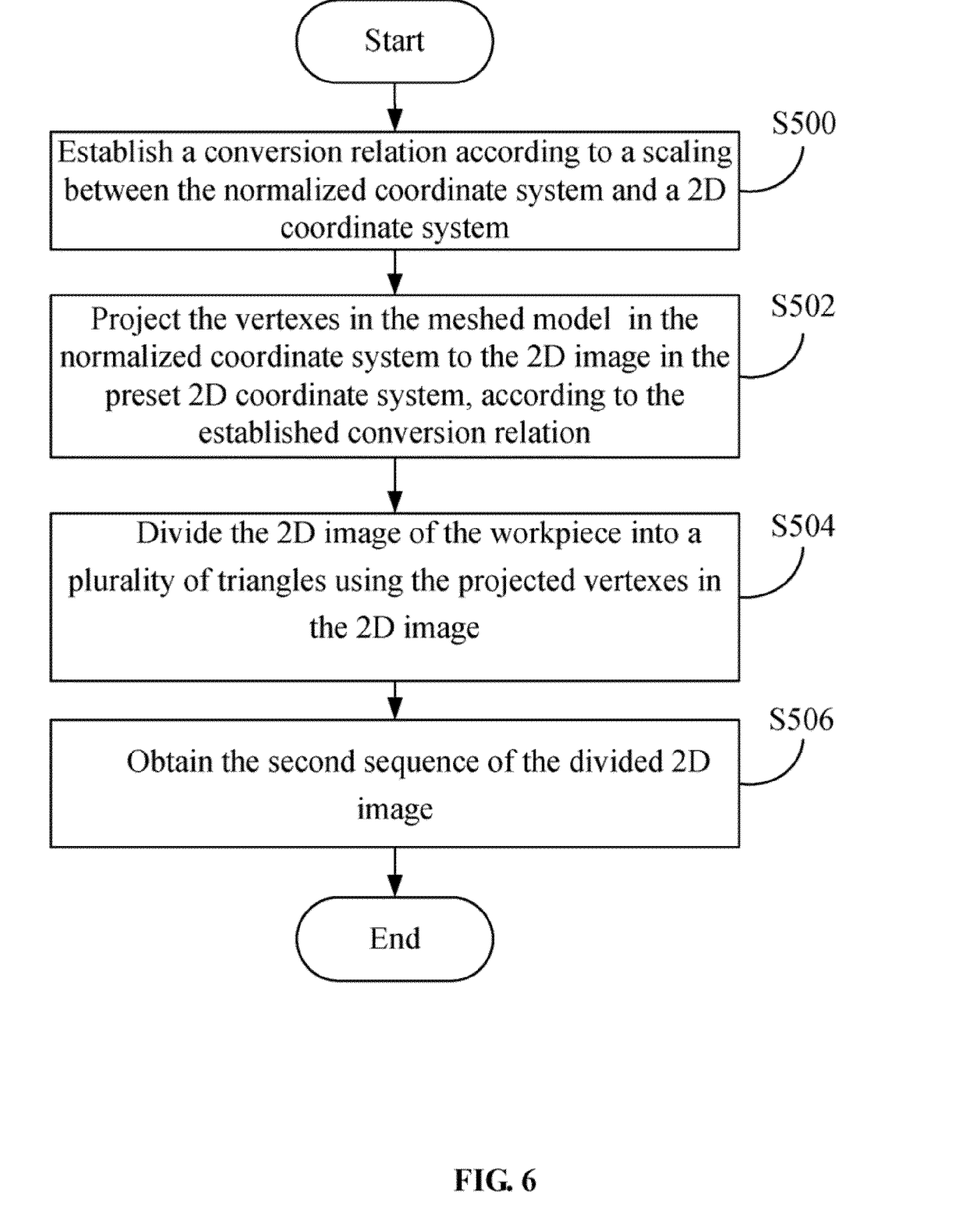
FIG. 6 is a detailed description of step S5 in FIG. 2, for dividing a 2D image of the workpiece into a plurality of triangles.

In step S5, the division module 104 projects the meshed model of the workpiece in the normalized coordinate system to the preset 2D coordinate system, divides a 2D image of the workpiece based on the projection, and obtains a second sequence of triangles of the divided 2D image. The division module 104 divides the 2D image according to the normalized coordinate system and the preset 2D coordinate system. The second sequence includes parameters of the triangles of the divided 2D image. The preset 2D coordinates system is preset using a second scaling according to the actual size of the workpiece. In some embodiments, a number of the triangles in the first sequence is the same as a number of the triangles in the second sequence. Details of dividing the 2D image of the workpiece are shown in FIG. 6.

In step S7, the pasting module 106 traverses the second sequence and obtains a pixel set and vertex coordinates of each of the triangles in the second sequence. In one embodiment, the pixel set of each of the triangles includes gray values of each of the triangles of the 2D image.

In step S9, the pasting module 106 electronically pastes each of the triangles in the second sequence to a corresponding position in the meshed 3D model. In one embodiment, the pasting module 106 determines the vertexes in the meshed 3D model according to the vertex coordinates of each of the triangles in the preset 2D coordinate system, and electronically pastes each of the triangles in the meshed 3D model according to the pixel set of each of the triangles of the 2D image. For example, each of the triangles in the preset 2D coordinate system may be copied and placed on a corresponding position of the meshed 3D model with a predetermined proportion, to give the 3D model substantially the real shape and material of a surface of the actual workpiece.

Figure 7:
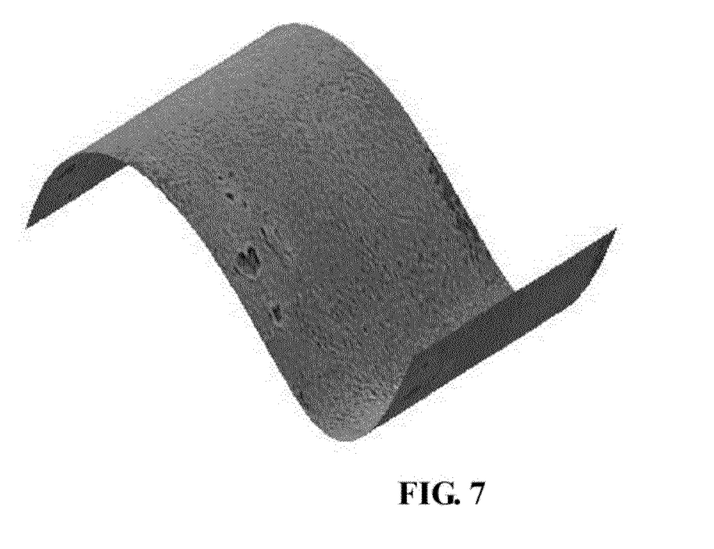
FIG. 7 illustrates an example of a pasted 3D model of the workpiece.

In step S11, the output module 108 displays the pasted 3D model on the display device 16, and the procedure ends. An example of the pasted 3D model of the workpiece is shown in FIG. 7. The pasted 3D model shows the colors and surface grain of the workpiece more realistically.

Figure 3:
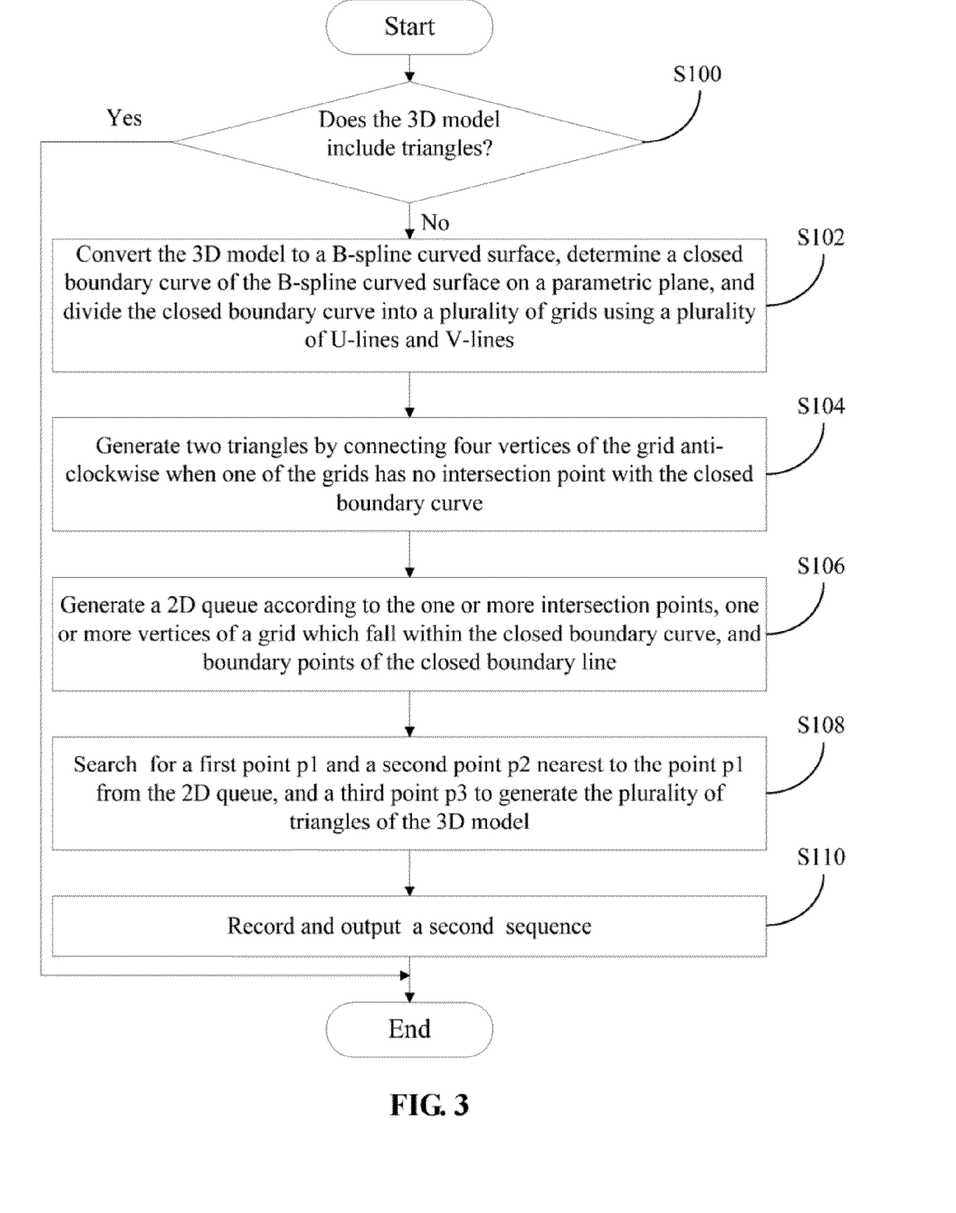
FIG. 3 is a detailed description of step S1 in FIG. 2, for meshing a 3D model of a workpiece.

FIG. 3 gives a detailed description of step S1 in FIG. 2, for meshing a 3D model of the workpiece.

In step S100, the meshing module 100 determines whether the 3D model includes one or more triangles. When the 3D model does include one or more triangles, step S110 is implemented. When the 3D model does not include any triangle, step S102 is implemented.

In step S102, the meshing module 100 converts the 3D model to a B-spline curved surface, and determines a closed boundary curve of the B-spline curved surface on a parametric plane. The meshing module 100 further divides the closed boundary curve into a plurality of grids (as shown in FIG. 4) using a plurality of horizontal lines (hereinafter referred to as "U-lines") and vertical lines (hereinafter referred to "V-lines").

Figure 4:
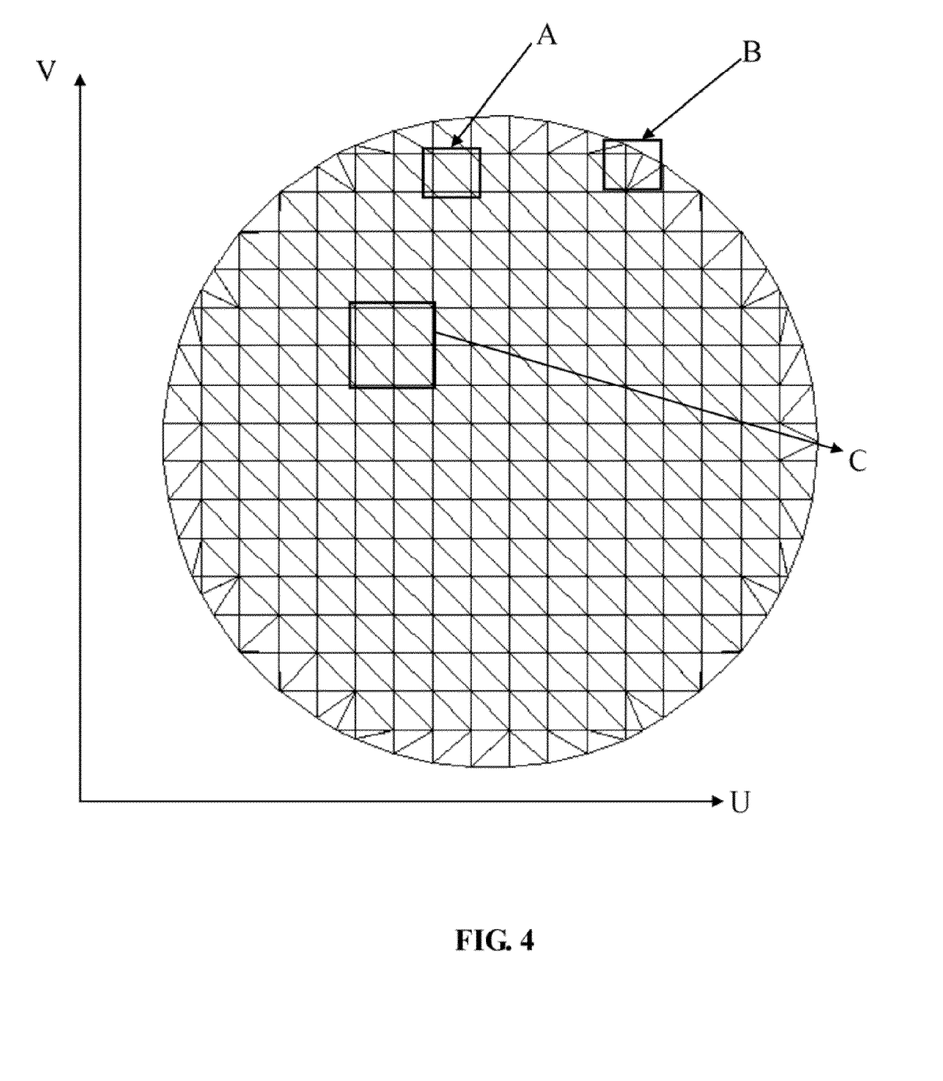
FIG. 4 illustrates an example of meshing the 3D model in FIG. 3 by a plurality of triangles.

In step S104, the meshing module 100 generates two triangles by connecting four vertices of the plurality of grids in an anti-clockwise direction, when one of the grids has no intersection point with the closed boundary curve (i.e., boxes "A" and "C" in FIG. 4).

In step S106, the meshing module 100 generates a two-dimensional (2D) queue according to one or more intersection points (i.e., points in a box "B" in FIG. 6), one or more vertices of a grid which fall within the closed boundary curve, and the boundary points of the closed boundary line, when the grid does have one or more intersection points with the closed boundary curve.

In step S108, the meshing module 100 searches for a first point p1 and a second point p2 nearest to the first point p1 from the 2D queue, and a third point p3 to generate the plurality of triangles of the 3D model. The meshing module 100 determines the third point p3 according to a determination rule that there is no 2D point of the 2D queue in a circumcircle of one triangle which includes the points p1, p2, and p3.

In step S110, the meshing module 100 records and outputs the first sequence of the 3D model into the storage system 12, and the procedure ends.

Figure 5:
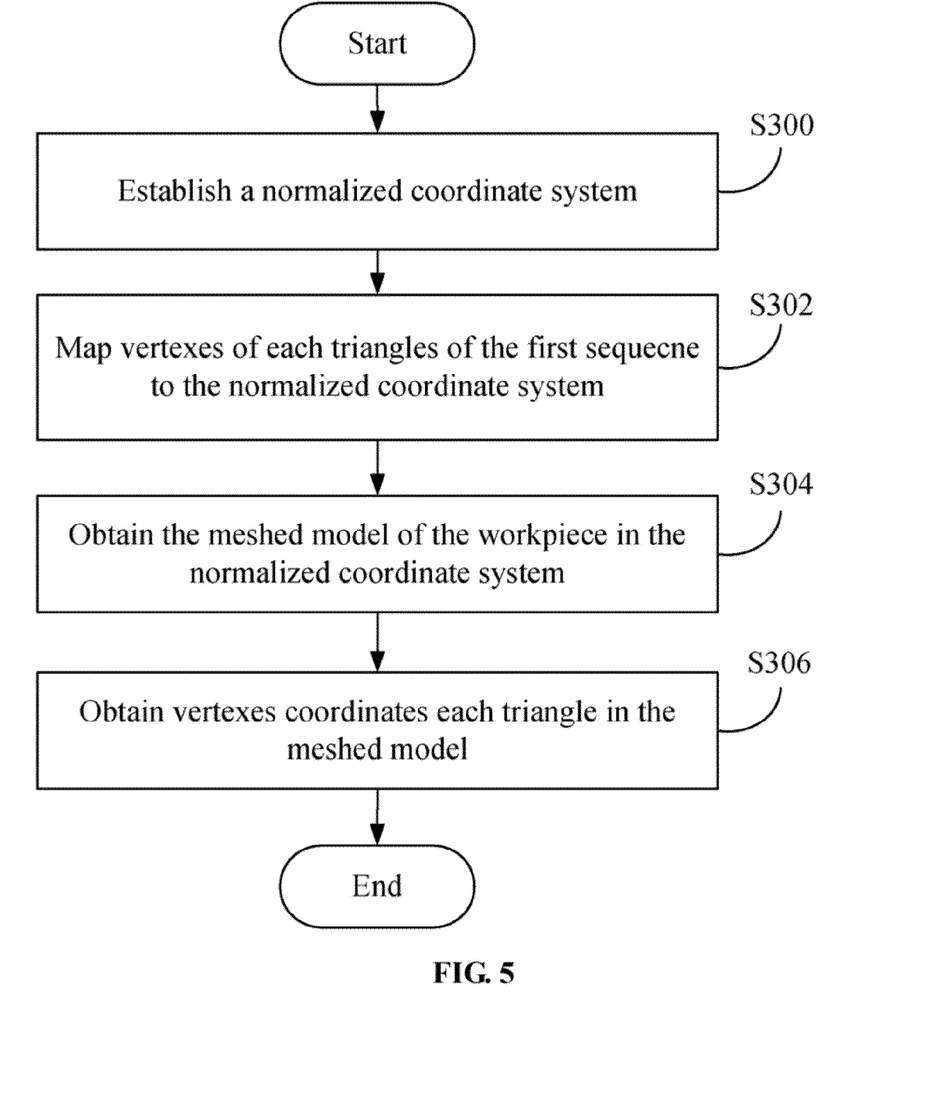
FIG. 5 is a detailed description of step S3 in FIG. 2, for normalizing vertexes of each of the triangles.

FIG. 5 gives a detailed description of step S3 in FIG. 2, for normalizing vertexes of each of the triangles.

In step S300, the normalizing module 102 establishes the normalized coordinate system. The normalized coordinate system is two-dimensional and includes a horizontal axis and a vertical axis.

In step S302, the normalizing module 102 maps the vertexes of each triangle in the first sequence to the normalized coordinate system.

In step S304, the normalizing module 102 obtains the meshed model of the workpiece in the normalized coordinate system.

In step S306, the normalizing module 102 obtains vertexes coordinates of each of the triangles of the meshed model.

FIG. 6 shows a detailed description of step S5 in FIG. 2, for dividing a 2D image of the workpiece into a plurality of triangles.

In step S500, the division module 104 establishes a conversion relationship according to a third scaling between the normalized coordinate system and the preset 2D coordinate system. The third scaling is determined according to the first scaling of the normalized coordinate system and the second scaling of the preset 2D coordinate system.

In step S502, the division module 104 projects the vertexes in the meshed model of the workpiece in the normalized coordinate system to the 2D image in the preset 2D coordinate system, according to the established conversion relationship.

In step S504, the division module 104 divides the 2D image of the workpiece into a plurality of triangles using the projected vertexes in the 2D image.

In step S506, the division module 104 obtains the second sequence of the divided 2D image, and the procedure ends.

All of the processes described above may be embodied in, and be fully automated via, functional code modules executed by one or more general-purpose processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

The described embodiments are merely possible examples of implementations, set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for simulating a three-dimensional (3D) model of a workpiece using an electronic device, the method being executed by at least one processor of the electronic device comprising:
    meshing, using the at least one processor, the 3D model of the workpiece using triangles, and outputting a first sequence of the triangles of the 3D model;
    normalizing, using the at least one processor, vertexes of each of the triangles in the first sequence, and obtaining a meshed model of the workpiece in a normalized coordinate system;
    dividing a two-dimensional (2D) image of the workpiece, and obtaining a second sequence of triangles of the divided 2D image by projecting the meshed model of the workpiece in the normalized coordinate system to a preset 2D coordinate system;
    obtaining, using the at least one processor, a pixel set and vertex coordinates of each of the triangles in the second sequence according to a traversal of the second sequence;
    electronically pasting each of the triangles in the second sequence to a corresponding position in the meshed 3D model; and
    displaying the pasted 3D model on a display device of the electronic device.

2. The method as described in claim 1, wherein the 3D model of the workpiece is meshed using triangles by:
    (a1). determining whether the 3D model comprises one or more triangles; when the 3D model comprises the one or more triangles, step (a6) being implemented, and when the 3D model does not comprise any triangle, step (a2) being implemented;

(a2). converting the 3D model into a B-spline curved surface, and determining a closed boundary curve of the B-spline curved surface on a parametric plane, and dividing the closed boundary curve into a plurality of grids using a plurality of horizontal lines and vertical lines;

(a3). generating two triangles by connecting four vertices of the grid anti-clockwise, when one of the plurality of grids has no intersection point with the closed boundary curve;

(a4). generating a 2D queue according to one or more intersection points, one or more vertices of a grid which fall within the closed boundary curve, and boundary points of the closed boundary line;

(a5). searching for a first point, a second point nearest to the first point from the 2D queue, and a third point to generate the plurality of triangles of the 3D model, the third point being determined according to a determination rule that there is no 2D point of the 2D queue in a circumcircle of one triangle comprising the first point, the second point, and the third point;

(a6). recording and outputting the first sequence of the 3D model into a storage system of the electronic device.

3. The method as described in claim 1, wherein the vertexes of each of the triangles in the first sequence are normalized by:
establishing the normalized coordinate system comprising a horizontal axis and a vertical axis;
mapping the vertexes of each triangle in the first sequence to the normalized coordinate system; and
obtaining the meshed model of the workpiece in the normalized coordinate system and obtaining vertexes coordinates of each of the triangles in the meshed model.

4. The method as described in claim 1, wherein the 2D image of the workpiece is divided by:
establishing a conversion relation according to a scaling between the normalized coordinate system and the preset 2D coordinate system;
projecting the vertexes in the meshed model of the workpiece in the normalized coordinate system to the 2D image in the preset 2D coordinate system, according to the established conversion relation;
dividing the 2D image of the workpiece into a plurality of triangles using the projected vertexes in the 2D image; and
obtaining the second sequence of the divided 2D image.

5. The method as described in claim 1, wherein each of the triangles in the second sequence is pasted by:
determining the vertexes in the meshed 3D model according to the vertex coordinates of each of the triangles in the 2D coordinate system, and pasting each of the triangles in the meshed 3D model according to the pixel set of each of the triangle of the 2D image.

6. The method as described in claim 1, wherein a number of the triangles in the first sequence is the same as a number of the triangles in the second sequence.

7. An electronic device, comprising:
a storage system;
at least one processor for executing one or more modules that are stored in the storage system to perform a method of simulating a three-dimensional (3D) model of a workpiece:
meshing a three-dimensional (3D) model of a workpiece using triangles, and outputting a first sequence of the triangles of the 3D model;

normalizing vertexes of each of the triangles in the first sequence, and obtains a meshed model of the workpiece in a normalized coordinate system;
dividing a two-dimensional (2D) image of the workpiece and obtains a second sequence of triangles of the divided 2D image, by projecting the meshed model of the workpiece in the normalized coordinate system to a preset 2D coordinate system;
traversing the second sequence and obtaining a pixel set and vertex coordinates of each of the triangles in the second sequence, and electronically pastes each of the triangles in the second sequence to a corresponding position in the meshed 3D model; and
displaying the pasted 3D model on a display device of the electronic device.

8. The electronic device as described in claim 7, wherein the 3D model of the workpiece is meshed by:
(a1). determining whether the 3D model comprises one or more triangles, when the 3D model comprises the one or more triangles, step (a6) being implemented, when the 3D model does not comprise any triangle, step (a2) being implemented;

(a2). converting the 3D model into a B-spline curved surface, and determining a closed boundary curve of the B-spline curved surface on a parametric plane, and dividing the closed boundary curve into a plurality of grids using a plurality of horizontal lines and vertical lines;

(a3). generating two triangles by connecting four vertices of the grid anti-clockwise, when one of the plurality of grids has no intersection point with the closed boundary curve;

(a4). generating a 2D queue according to one or more intersection points, one or more vertices of a grid which fall within the closed boundary curve, and boundary points of the closed boundary line;

(a5). searching for a first point, a second point nearest to the first point from the 2D queue, and a third point to generate the plurality of triangles of the 3D model, the third point being determined according to a determination rule that there is no 2D point of the 2D queue in a circumcircle of one triangle comprising the first point, the second point, and the third point;

(a6). recording and outputting the first sequence of the 3D model into a storage system of the electronic device.

9. The electronic device as described in claim 8, wherein the vertexes of each of the triangles in the first sequence are normalized by:
establishing the normalized coordinate system comprising a horizontal axis and a vertical axis;
mapping the vertexes of each triangle in the first sequence to the normalized coordinate system; and
obtaining the meshed model of the workpiece in the normalized coordinate system, and obtaining vertexes coordinates of each of the triangles in the meshed model.

10. The electronic device as described in claim 7, wherein the 2D image of the workpiece is divided by:
establishing a conversion relation according to a scaling between the normalized coordinate system and the preset 2D coordinate system;
projecting the vertexes in the meshed model of the workpiece in the normalized coordinate system to the 2D image in the preset 2D coordinate system, according to the established conversion relation;
dividing the 2D image of the workpiece into a plurality of triangles using the projected vertexes in the 2D image; and obtaining the second sequence of the divided 2D image.

11. The electronic device as described in claim 7, wherein each of the triangles in the second sequence is pasted by:
   determining the vertexes in the meshed 3D model according to the vertex coordinates of each of the triangles in the 2D coordinate system, and pasting each of the triangles in the meshed 3D model according to the pixel set of each of the triangle of the 2D image.

12. The electronic device as described in claim 7, wherein a number of the triangles in the first sequence is the same as a number of the triangles in the second sequence.

13. A non-transitory computer readable storage medium having stored thereon instructions that, when executed by a processor of an electronic device, causes the electronic device to perform a method for simulating a three-dimensional (3D) model of a workpiece using an electronic device, the method comprising:
   meshing a 3D model of the workpiece using a plurality of triangles, and outputting a first sequence of the triangles of the 3D model including information and details of the plurality of triangles;
   normalizing vertexes of each of the triangles in the first sequence, and obtaining a meshed model of the workpiece in a normalized coordinate system;
   dividing a two-dimensional (2D) image of the workpiece and obtaining a second sequence of triangles of the divided 2D image, by projecting the meshed model of the workpiece in the normalized coordinate system to a preset 2D coordinate system;
   obtaining a pixel set and vertex coordinates of each of the triangles in the second sequence by traversing the second sequence;
   electronically pasting each of the triangles in the second sequence to a corresponding position in the meshed 3D model; and
   displaying the pasted 3D model on a display device of the electronic device.

14. The non-transitory computer readable storage medium as described in claim 13, wherein meshing the 3D model comprises:
   (a1). determining whether the 3D model comprises one or more triangles, when the 3D model comprises the one or more triangles, step (a6) being implemented, when the 3D model does not comprise any triangle, step (a2) being implemented;
   (a2). converting the 3D model into a B-spline curved surface, and determining a closed boundary curve of the B-spline curved surface on a parametric plane, and dividing the closed boundary curve into a plurality of grids using a plurality of horizontal lines and vertical lines;
   (a3). generating two triangles by connecting four vertices of the grid anti-clockwise, when one of the plurality of grids has no intersection point with the closed boundary curve;
   (a4). generating a 2D queue according to one or more intersection points, one or more vertices of a grid which fall within the closed boundary curve, and boundary points of the closed boundary line;
   (a5). searching for a first point, a second point nearest to the first point from the 2D queue, and a third point to generate the plurality of triangles of the 3D model, the third point being determined according to a determination rule that there is no 2D point of the 2D queue in a circumcircle of one triangle comprising the first point, the second point, and the third point;
   (a6). recording and outputting the first sequence of the 3D model into a storage system of the electronic device.

15. The non-transitory computer readable storage medium as described in claim 13, wherein normalizing the vertexes of each of the triangles comprises:
   establishing the normalized coordinate system comprising a horizontal axis and a vertical axis;
   mapping the vertexes of each triangle in the first sequence to the normalized coordinate system; and
   obtaining the meshed model of the workpiece in the normalized coordinate system, and obtaining vertexes coordinates of each of the triangles in the meshed model.

16. The non-transitory computer readable storage medium as described in claim 13, wherein dividing a 2D image of the workpiece comprises:
   establishing a conversion relation according to a scaling between the normalized coordinate system and the preset 2D coordinate system;
   projecting the vertexes in the meshed model of the workpiece in the normalized coordinate system to the 2D image in the preset 2D coordinate system, according to the established conversion relation;
   dividing the 2D image of the workpiece into a plurality of triangles using the projected vertexes in the 2D image;
   obtaining the second sequence of the divided 2D image.

17. The non-transitory computer readable storage medium as described in claim 13, wherein each of the triangles in the second sequence is pasted by:
   determining the vertexes in the meshed 3D model according to the vertex coordinates of each of the triangles in the 2D coordinate system, and pasting each of the triangles in the meshed 3D model according to the pixel set of each of the triangle of the 2D image.

18. The non-transitory computer readable storage medium as described in claim 13, wherein a number of the triangles in the first sequence is the same as a number of the triangles in the second sequence.

* * * * *